(12) United States Patent
Scandola et al.

(10) Patent No.: US 6,667,366 B2
(45) Date of Patent: Dec. 23, 2003

(54) CHEMICAL MODIFICATION OF THE SURFACE OF NATURAL FIBERS

(75) Inventors: Mariastella Scandola, Bologna (IT); Sergio Sandri, Forli' (IT); Massimo Baiardo, Bologna (IT); Giovanna Frisoni, Bologna (IT)

(73) Assignee: Universita' Degli Studi di Bologna, Bologna (IT)

( * ) Notice: Subject to any disclaimer, the term of this patent is extended or adjusted under 35 U.S.C. 154(b) by 0 days.

(21) Appl. No.: 09/897,984

(22) Filed: Jul. 5, 2001

(65) Prior Publication Data

US 2002/0086938 A1 Jul. 4, 2002

(30) Foreign Application Priority Data

Jul. 5, 2000 (EP) .............................. 00830474

(51) Int. Cl.⁷ .................. C08F 283/02; C08F 283/04
(52) U.S. Cl. .................. 525/54.2; 525/118; 524/35
(58) Field of Search ................ 525/54.2, 118; 524/35

(56) References Cited

U.S. PATENT DOCUMENTS

| 2,109,295 A |   | 2/1938 | Lawrie et al. |
| 3,492,082 A |   | 1/1970 | Lee |
| 4,803,116 A | * | 2/1989 | Amano et al. .............. 428/286 |
| 4,857,588 A |   | 8/1989 | Coleman-Kammula |

FOREIGN PATENT DOCUMENTS

| DE | 44 40 246 A1 | 5/1996 |
| GB | 1 590 176 | 5/1981 |

* cited by examiner

Primary Examiner—James J. Seidleck
Assistant Examiner—Olga Asinovsky
(74) Attorney, Agent, or Firm—Arent Fox Kintner Plotkin & Kahn, PLLC

(57) ABSTRACT

The present invention relates to polymer-grafted natural fiber used for the preparation of composite materials. The invention relates in particular to a process for making such polymer-grafted natural fibers.

11 Claims, 3 Drawing Sheets

Po = Polyolefins; Pes = Polyesters; Peth = Polyethers; PA = Polyamides (From J. Bandrup, E.H. Immergut, E.A. Grulke, "Polymer Handbook", 4 th Ed., 1999, Wiley, New York Po = Polyolefins; Pes = Polyesters; Peth = Polyethers; PA = Polyamides (From J. Bandrup, E.H. Immergut, E.A. Grulke, "Polymer Handbook", 4th Ed., 1999, Wiley, New York

CHEMICAL MODIFICATION OF THE SURFACE OF NATURAL FIBERS

BACKGROUND OF THE INVENTION

The present invention relates to a polymer-grafted fiber used to make composite materials. The invention relates in particular to a method for making such polymer-grafted natural fibers.

It is well known that composite materials are used in many applications on account of their excellent mechanical properties. The mechanical properties of composites are a function of the properties of the individual components.

Composites consist basically of two distinct phases: a first continuous phase (matrix) and a second dispersed phase. In many cases, the continuous phase (matrix) is a polymer. A second component is dispersed in the first continuous phase to make the second dispersed phase.

The dispersed phase in composites is usually designed to improve the mechanical properties of the matrix. The dispersed phase may have very different properties, form and dimensions, depending on the specific function it has to perform within the composite.

Many known composites are reinforced with fibers such as, for example, glass, carbon or synthetic polymer fibers.

Composites consisting of a polymer matrix with natural fibers as the reinforcing agent have only recently been introduced. The natural fibers most used for this purpose are of plant origin, and in particular, cellulose fibers.

The interest in materials reinforced with natural fibers can be ascribed to the following reasons:
- natural fibers are obtained from renewable, low-cost sources;
- natural fibers have very good mechanical properties;
- natural fibers have a low specific weight compared to the synthetic or glass fibers usually used;
- natural fibers are environmentally friendly since they are biodegradable and burn easily and can therefore be conveniently disposed of after use.

To obtain composites with good mechanical properties, the adhesion between the continuous phase (matrix) and the dispersed phase (fiber) must be optimized, since the mechanical load applied to the matrix must be effectively transferred to the fiber. In a composite, it is the fiber component that confers the good mechanical properties. The effectiveness of the adhesion at the interface between fiber and matrix depends largely on the surface properties of both components. Usually, the surface properties are correlated to parameters such as surface tension and polarity. The surface properties of the polymer matrices currently available on the market, used in the preparation of composites, are very different from the surface properties of natural fibers. However, to obtain good adhesion at the interface between fiber and matrix, the surface tension and polarity of the two components must be very similar.

The continuous phase (matrix) or the dispersed phase (fiber) can be chemically modified in numerous ways to suitably change the surface properties.

One way of chemically modifying the surface of a fiber is by grafting polymer chains onto it.

A fiber can be grafted with polymer chains which polymerize in situ or with ready-made polymer chains.

In the first type of grafting process, it is difficult to control the degree of polymerization and hence the length of the grafted chains.

The second process allows polymer chains of different types and preset length to be grafted.

U.S. Pat. No. 3,492,082 discloses a process for the preparation of polymer-grafted cellulose fibers.

In U.S. Pat. No. 3,492,082 the grafted cellulose fibers are prepared by converting the hydroxyl groups of the cellulose into hydroperoxide groups through the formation of an intermediate sulphonate ester group. The cellulose containing the hydrogen peroxide groups is subsequently reacted with a reactive monomer to yield the grafted cellulose material. The following monomers are used; styrene; butadiene; acrylonitrile; N-vinylpyrrolidone; acrylamide; and others. These monomers are capable of polymerizing with the hydroperoxide groups on the cellulose fiber in the presence of a free-radical initiator.

Hence, U.S. Pat. No. 3,492,082 describes a free-radical type, in situ polymerizing process. The free-radical polymerization produces on the fiber grafted chains with a very wide length distribution. The chain length of the polymer grafts thus varies considerably and cannot be predetermined. The kinetics of the free radical grafting reaction are difficult to control.

U.S. Pat. No. 4,857,588 discloses a process for the preparation of cellulose fibers with ready-made polymer grafts.

U.S. Pat. No. 4,857,588 describes a process in which the cellulose material is first treated with an aqueous sodium hydroxide solution. The cellulose material is then treated with sodium methoxide in methanol in order to convert the hydroxyl groups of cellulose into salified oxy groups with sodium in a quantity ranging from 0.25 to 33.3%.

Next, the resulting cellulose material is contacted with a ready-made organic compound having a chain with an electrophilic functional group at one end.

The main disadvantage of the fibers treated using the method described in U.S. Pat. No. 4,857,588 is that the fibers are subjected to a very drastic pre-treatment in an alkaline solution which alters their original structural, chemical and mechanical properties.

The treatment described by U.S. Pat. No. 4,857,588 (NaOH in 5N aqueous solution), modifies the crystal structure of the native cellulose fibers, as clearly shown by the X-ray diffraction spectrum. Indeed, following treatment as taught by U.S. Pat. No. 4,857,588 the spectrum shows the reflections typical of the crystal structure of regenerated cellulose known as cellulose II, as shown in FIG. 1B.

Therefore, one of the aims of the present invention is to provide natural fibers whose surface properties are modified in such a way as to obtain composite materials having improved mechanical properties.

Another aim of the present invention is to provide a process for the preparation of polymer-grafted natural fibers which leaves the mechanical properties of the fiber unchanged.

SUMMARY OF THE INVENTION

According to one aspect of it, as described in claim 1 hereof, the present invention provides a process for the preparation of polyether-grafted natural fibers.

This process keeps the mechanical properties of the natural fiber unchanged. Indeed, the chemical modifications do not affect the body of the fiber and do not alter its structure. Only the outer surface of the grafted natural fibers obtained using this process is modified.

Another advantage of the process according to the present invention is in that it reduces the hydrophilicity of the fiber so that the surface properties of the fibers become similar to those of the polymers used as matrices, thus improving the adhesion between the fiber and the polymer matrix. The dependent claims describe preferred embodiments of the process according to the present invention.

The invention also relates to a polyether-grafted natural fiber, as described in the corresponding independent claim, made preferably but not necessarily using the process according to the present invention.

The polyether-grafted natural fiber according to the present invention is highly compatible with the polymer matrices of numerous composite materials. Its surface properties are modified to improve the adhesion between it and the matrix of the composite material. Further, since only the surface structure of the natural fiber is modified, the body of the grafted fiber remains unchanged and maintains its mechanical resistance. The resulting composite material therefore has better mechanical properties than composite materials known up to now.

In a preferred embodiment, the grafted natural fiber is a cellulose fiber and the polyether has a general formula (I), as described below.

The invention also relates to a composite material comprising polyether-grafted natural fibers, as described in the corresponding independent claim, made preferably but not necessarily using the process according to the present invention.

In a preferred embodiment, the composite material comprises cellulose fibers grafted with a polyether having a general formula (I), as described below.

The present invention further relates to the use of polyether-grafted natural fibers made preferably but not necessarily using the process according to the present invention for the preparation of composite materials, as described in the corresponding independent claim.

In a preferred embodiment, the natural fibers used in the preparation of the composite materials are cellulose fibers prepared according to the process taught by the present invention.

BRIEF DESCRIPTION OF THE DRAWINGS

Further technical characteristics and advantages of the invention are apparent from the detailed description which follows, with reference to the accompanying drawings, in which.

DESCRIPTION OF THE PREFERRED EMBODIMENTS

Figure 1A:
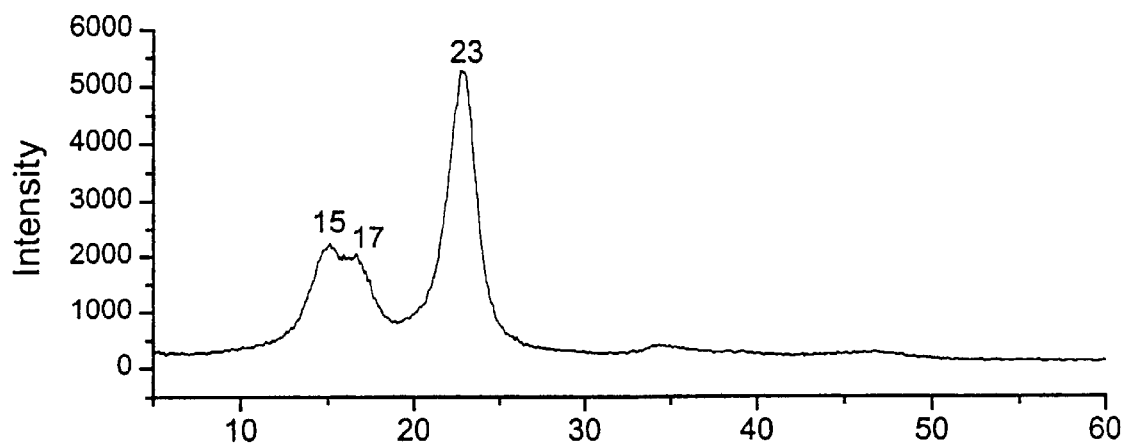
FIG. 1A shows a wide-angle X-ray diffraction spectrum of a grafted fiber made according to the present invention.
Figure 1B:
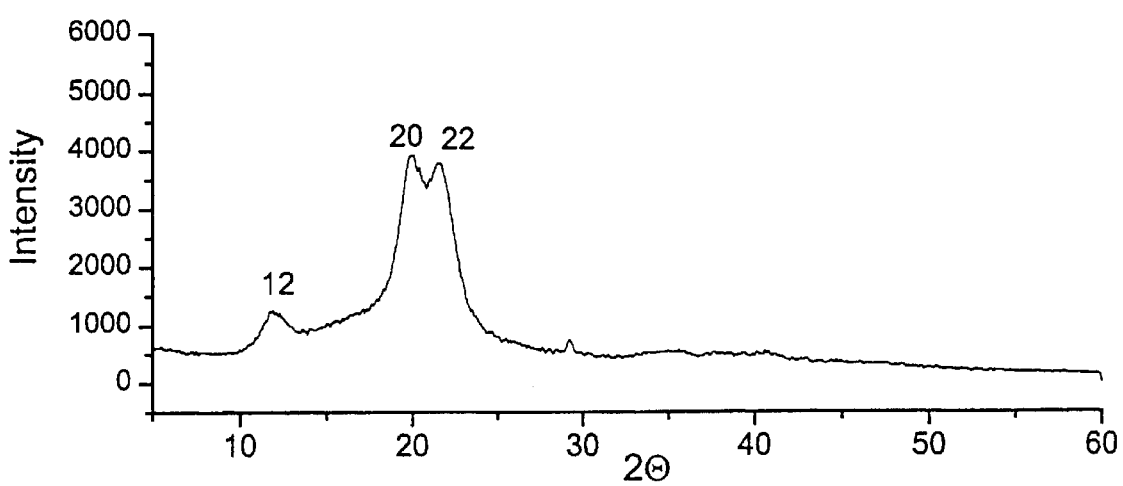
FIG. 1B shows a wide-angle X-ray diffraction spectrum of a fiber that was pre-treated in NaOH 5 N according to the teachings of prior art.

In the present description, the term "natural fibers" denotes any natural fibers having on their surfaces hydroxyl groups on which a ready-made polymer chain can be grafted.

The fibers used are preferably the cellulose fibers of certain plants. Of these, cotton, flax and hemp fibers are preferred.

According to the present process, the natural fibers first undergo a pre-treatment. During this pre-treatment step, the natural fibers are dried.

The pre-treatment step is preferably performed under vacuum at a temperature in the range of from 50° C. to 100° C. for a time of between 2 and 48 hours.

Subsequently, the pre-treated fibers are contacted with a first solution comprising an alkaline reagent. In a first preferred embodiment, the first solution comprises an anhydrous solvent such as, for example, tetrahydrofuran (THF) and an alkali such as, for example, potassium-tert-butylate and a crown ether such as 18-crown-6.

The potassium-tert-butylate and the crown ether are present preferably in equimolar quantities.

Advantageously, the quantity of potassium-tert-butylate exceeds the total quantity of hydroxyl groups of the natural fiber. The reaction occurs in an anhydrous environment in an inert atmosphere.

The natural fibers are preferably allowed to react with the solution for a time ranging from 1 to 6 hours and at a temperature in the range of from 30° C. to 80° C.

During this step, the hydroxyl groups in the natural fibers are converted into alcoholates via the alkaline reagent. In the present description, the alcoholate groups are also referred to as oxy groups. The alcoholates are in the salified form with the cation of the alkali used: in this case, the cation is the potassium cation.

The use of potassium-tert-butylate with 18-crown-6 is advantageous because the crown ether acts as a phase transfer agent since it protects the potassium cation and at the same time makes it available for the alcoholate.

This step is designed to activate the natural fibers before grafting the polyether chains on the salified oxy groups.

In a second preferred embodiment, the first solution comprises an anhydrous solvent, such as, for example, methyl alcohol and an alkali such as, for example, sodium methylate. The reaction occurs in an anhydrous environment in an inert atmosphere.

The natural fibers are preferably allowed to react with the solution for a time ranging from 1 to 48 hours and at a temperature in the range of from 20° C. to 80° C.

During this step, the hydroxyl groups in the natural fibers are converted into alcoholates via the alkaline reagent.

The alcoholates are in the salified form with the cation of the alkali used: in this case, the cation is the sodium cation.

This step is another way of activating the natural fibers before grafting the polyether chains on the salified oxy groups.

If the fibers are activated according to the second preferred embodiment (sodium methylate), the process comprises a further, filtering step. In practice, the solution containing the natural fibers and the sodium methylate is filtered in order to remove the solvent and reagent dissolved in it. The solvent and the reagent consist, for example, of methyl alcohol and sodium methylate.

After filtering, washings in anhydrous tetrahydrofuran (THF) are performed to remove all traces of alkaline reagent.

According to the present invention, the polyether chains are ready-made before being grafted on the activated fiber.

Subsequently, the natural fibers with the salified oxy groups are reacted with a polyether in an inert atmosphere.

Preferably the polyether is one having an aliphatic or aliphatic/aromatic group at one end and a leaving group at the other end.

Advantageously, the polyether, having the general formula (I), is a polyether functionalized by a group that favors nucleophilic substitution (a good leaving group):

$$R[-O-X-]_m Y \qquad (I)$$

where:
m is between 1 and 200;
R is an aliphatic or aliphatic/aromatic group;
Y is a functional leaving group;
and where X has the general formula (II)

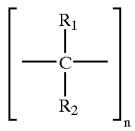

(II)

where:
n is between 1 and 20;
R2 is either hydrogen or a linear or branched C1–C4 alkyl group; and
R1 is the same as or different from R2 and is either hydrogen or a linear or branched C1–C4 alkyl group;
or where X has the general formula (III)

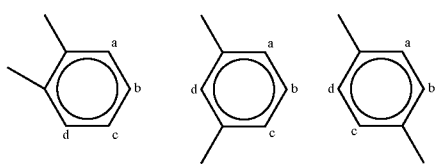

(III)

having at the positions of the ring a), b), c) and d) one or more substituting groups which may be the same or different from each other and which may be a group comprising a halogen or a linear or branched C1–C4 alkyl.

As stated above, m may be between 1 and 200, but ideally, m is between 4 and 60.

Preferably, the aliphatic R group is either a linear or branched C1–C4 alkyl group.

Preferably, the aliphatic/aromatic R group is a benzyl group.

As stated above, n may be between 1 and 20, but ideally, n is between 2 and 5.

R1 may be the same as or different from R2 and may be either hydrogen or a linear or branched aliphatic group. Preferably, R1 and/or R2 are either hydrogen or a linear or branched C1–C4 alkyl group.

At the ring positions labeled a), b), c) and d), there may be one or more substituting halogens chosen from chlorine, bromine and iodine.

Preferably, the ring presents two substituting groups between positions a), b), c) and d).

In the present description, linear or branched C1–C4 alkyl group (or alkyl) means a methyl, ethyl, n-propyl, isopropyl, n-butyl, sec-butyl, isobutyl or tert-butyl group.

The polyether of general formula (I) has at its two ends an R and a Y group. The Y group is a functional leaving group which favors nucleophilic substitution.

Preferably, the Y group is a group of those commonly used to favor nucleophilic substitution. Halides of chlorine, bromine or iodine can be used to good advantage as the Y group. Alternatively, the Y group is a mesylate group.

Preferably, the polyethers of general formula (I) are polyoxyethylene R—(O—$OH_2$—$CH_2$)$_m$—Y or polyoxypropylene R—(O—$CH_2$—$CH_2CH_2$—)$_m$—Y.

The pre-treated and activated natural fibers can be reacted with the polyether in the presence of an anhydrous solvent at a temperature within a range of from 30° C. to 80° C. for a time of between 1 and 24 hours.

Ideally, however, the reaction is made at a temperature in a range of from 60° C. to 80° C.

It is during this step that the polyether derivative is grafted onto the activated natural fibers. In practice, the polyether of general formula (I) reacts with the salified alcoholate to yield Cell —O—[X—O]$_m$—R.

On being grafted onto the fiber, the polyether loses the leaving Y group.

Advantageously, after the grafting step, the grafted natural fibers undergo one or more steps of filtering and one or more steps of washing with a solution containing water and/or acetone and/or ether. Lastly, a step of drying the grafted natural fibers can be carried out. The reactions described above are made in heterogeneous phase and in an anhydrous environment.

The process will be further illustrated by the following Examples without restricting the scope of the inventive concept.

EXAMPLE 1 cellulose fiber grafted with $CH_3$—(O—$CH_2$—$CH_2$)$_n$—O—$CH_2$—$CH_2$—I (n=43, MW=2000).

Pre-Treatment Step

The fibers are dried under vacuum for 16 hours at 80° C.

Activation Step

The following are added to a 200 ml anhydrous THF solution:

8 mM (8 ml 1N solution in anhydrous THF) of potassium-tert-butylate and 8 mM (2.1 g) of 18-crown-6 ether.

The solution is heated to a temperature of 70° C. in an inert atmosphere.

1 g of fiber is added and the solution containing the fibers (sol. 1) is allowed to react for 3 hours at 70° C.

Grafting step A solution of 6 mM (12 g) of PEO-I (MW=2000) in 30 ml of anhydrous THF is prepared (sol. 2).

This solution (sol. 2) is added to the reactor (sol. 1) and allowed to react for 5 hours at 70° C.

The reaction is extinguished with water. The fibers are filtered and washed in abundant water, acetone and ethyl ether and then dried under vacuum at 80° C. for 16 hours.

EXAMPLE 2 cellulose fiber grafted with $CH_3$—(O—$CH_2$—$CH_2$)$_n$—O—$CH_2$—$OH_2$—O—$SO_2$—$CH_3$ (n=5, MW=350).

Pre-Treatment Step

The fibers are dried under vacuum for 16 hours at 80° C.

Activation Step

The following are added to a 200 ml anhydrous THF solution:

8 mM (8 ml 1N solution in anhydrous THF) of potassium tert-butylate and 8 mM (2.1 g) of 18-crown-6 ether.

The solution is heated to a temperature of 70° C. in an inert atmosphere.

1.5 g of fiber are added and the solution containing the fibers (sol. 1) is allowed to react for 5 hours at 70° C.

Grafting Step

A solution of 27 mM (13 g) of PEO—$SO_2$—$CH_3$ (MW=350) in 15 ml of anhydrous THF is prepared (sol. 2).

This solution (sol. 2) is added to the reactor (sol. 1) and left to react for 3 hours at 70° C.

The reaction is extinguished with water. The fibers are filtered and washed in abundant water, acetone and ether and then dried under vacuum at 100° C. for 16 hours.

EXAMPLE 3 cellulose fiber grafted with $CH_3$—(O—$CH_2$—$CH_2$)$_n$—O—$CH_2$—$CH_2$—I (n=13, MW=750).

Pre-Treatment Step

The fibers are dried under vacuum for 16 hours at 80° C.

Activation step 43 mM (1 g) of metallic sodium is added to a 50 ml solution of $CH_3OH$ and allowed to react for 30 minutes at 25° C.

1 g of fiber is added to this solution (containing sodium methylate in methanol) in an inert atmosphere and the solution, containing the fibers (sol. 1) is allowed to react for 20 hours at 25° C.

After filtering and washing several times with anhydrous THF, 30 ml of anhydrous THF are added, still in an inert atmosphere (sol. 1).

Grafting Step

A solution containing 10 mM (7.5 g) of PEO-I (MW=750) in 20 ml of anhydrous THF is prepared (sol. 2).

This solution (sol. 2) is added to the reactor (sol. 1) and allowed to react for 3 hours at 70° C.

The fibers are filtered and washed in abundant water, acetone and ether and then dried under vacuum at 80° C. for 16 hours.

The natural fibers treated using the process according to the present invention were analyzed by TOF-SIMS (Time of Flight Secondary Ion Mass Spectrometry) in order to check the fiber surface for polyether chains. This technique measures the mass of the ion fragments that peel off the surface as a result of ion bombarding. The fibers treated according to the present invention show TOF-SIMS signals typical of the fragmentation products of the polyether grafts.

The micro and macro structural characteristics of the natural fibers treated according to the process of the present invention were analyzed using a scanning electron microscope and wide-angle X-ray diffraction. The result is shown in FIG. 1A.

As shown by the X-ray diffraction spectra, all the chemical treatments performed on the cellulose fibers leave the native crystal structure unchanged. The spectrum before and after chemical modification reveals no differences and exactly matches the crystal structure of the natural cellulose, referred to as cellulose I.

A few preparations of functionalized polyethers of formula (I) are shown in the examples below.

EXAMPLE 4

Preparation of a polyether of the formula (I) having a mesylate group at one end and an alkyl group at the other end A solution (a) containing 60 mM of a poly(oxyethylene) of the formula $CH_3$—(—O—$CH_2$—$CH_2$—)$_n$—OH, with n=16 and molecular weight 750 in 100 ml of $CH_2Cl_2$ and 75 mM of triethylamine is prepared.

Another solution (b) containing 65 mM of $CH_3$—$SO_2$—Cl in 30 ml of $CH_2Cl_2$ is prepared.

At the temperature of 0° C., the solution (b) is added to the solution (a) dropwise. The reaction is maintained at 0° C. for 3 hours. During the reaction, the triethylamine chlorohydrate precipitates. Water is added and the triethylamine chlorohydrate solubilizes. The organic phase is separated. Subsequently, the organic phase is concentrated in volume. The liquid organic phase contains $CH_3$—(—$OCH_2$—$CH_2$—)$_{16}$—O—$SO_2$—$CH_3$ which will be used to graft the natural fibers according to the process of the present invention.

EXAMPLE 5

Preparation of a polyether of the formula (I) having a halogen group at one end and an alkyl group at the other end A solution containing 54 mM of mesylate, as pre-pared in example 4, in 100 ml of acetone is prepared.

Another solution containing 100 mM of NaI (10 g) in 100 ml of acetone is prepared.

At the temperature of 25° C. the sodium iodide solution is added to the mesylate solution dropwise and the reaction maintained for 48 hours. This yields a pale yellow solution containing sodium methanesulphonate salt ($CH_3$—$SO_3$—Na) Subsequently, the solution is filtered and concentrated, diluted in methylene chloride and washed with an aqueous solution of $Na_2S_2O_3$. The solution, concentrated again, contains the poly(oxyethylene) mono-methyl-ether iodide which will be used to graft the natural fibers according to the process of the present invention.

The process according to the present invention has several advantages. The first advantage is in that the process chemically modifies mainly the outer surface of the natural fibers to improve the adhesion between fiber and polymer matrix in composite materials. Improved adhesion between fiber and polymer matrix yields a composite material with improved mechanical properties.

The fibers grafted using the process taught by the present invention have numerous applications in the field of polymer matrix composites where the reinforcing phase consists of natural fibers from renewable sources and not glass fibers and/or synthetic fibers.

The polyether-grafted natural fibers can be used to good advantage in the preparation of composite materials. The advantage of these materials is that they have a lower density than composite materials that use carbon or glass fibers. The table shows the specific weight ($\rho$) of certain synthetic/natural fibers used as reinforcing agents in polymer matrix composites:

| Reinforcing agents | $\rho$ (g/cm$^3$) |
|---|---|
| Glass fibers | 2.5–2.6 |
| Carbon fibers | 1.7–1.8 |
| Aramid fibers | 1.5 |
| Natural fibers | 1.2–1.6 |

The fibers treated according to the process taught by the present invention differ considerably from the same fibers treated using the processes taught by prior art. Indeed, unlike fibers treated according to prior art, fibers treated with the process of the present invention maintain their original fiber structure. Furthermore, the surface properties differ from those of fibers yielded by known processes since the polymer grafts themselves are different and the surface properties depend directly on the type of polymer grafts.

The table below shows, by way of example, the surface tension and polarity of some select classes of polymers that can be used as matrices for the preparation of composite materials with natural fibers:

TABLE 1

| POLYMERS | SURFACE TENSION Dyn/cm | POLARITY |
|---|---|---|
| Polyolefins | 30–40 | 0 |
| Polyethers | 30–45 | 0.003–0.28 |
| Polyesters | 40–50 | 0.15–0.29 |
| Polyamides | 31–49 | 0.15–0.43 |
| Acrylics | 30–42 | 0.03–0.25 |
| Metacrylics | 29–41 | 0.16–0.28 |
| Epoxy resins | 24–51 | 0.017–0.43 |
| Cellulose acetate | 46 | 0.3 |
| Cellulose* | 55 | 0.82 |

*Value calculated using the group contribution method (D. W. Van Krevelen "Properties of Polymers", 3rd Ed. 1990, Elsevier, Amsterdam)

All the values shown in Table I are experimental values (J. Bandrup, E. H. Immergut, E. A. Grulke, "Polymer Handbook", 4th Ed., 1999, Wiley, New York), except for the value for cellulose, which is calculated.

As shown in Table I, the surface tension and polarity values for the polymer families which can be used as matrices in composite materials are lower than the value for cellulose.

It is precisely to reduce the surface tension and polarity of cellulose that polymer chains of different length, that is, of different molecular weight (MW), are grafted according to the process taught by the present invention.

Figure 2A:
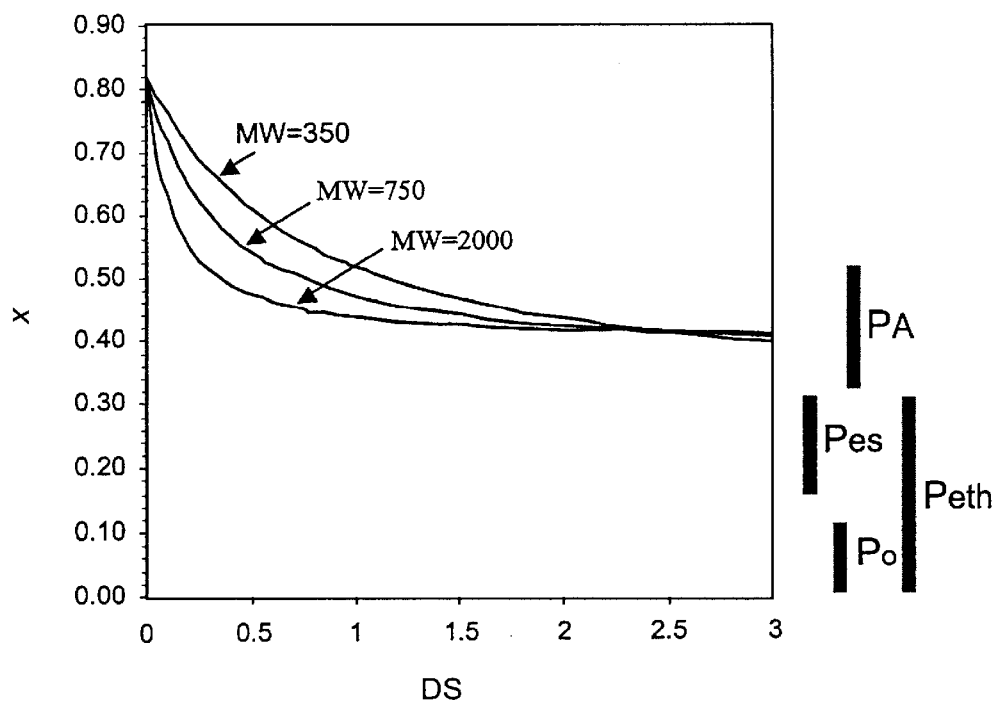
FIGS. 2A and 2B show, respectively, the changes in the polarity and surface tension of the cellulose with changing in both degree of substitution (DS) and molecular weight (MW) of the polyether graft (in this case, polyethylene oxide).
Figure 2B:
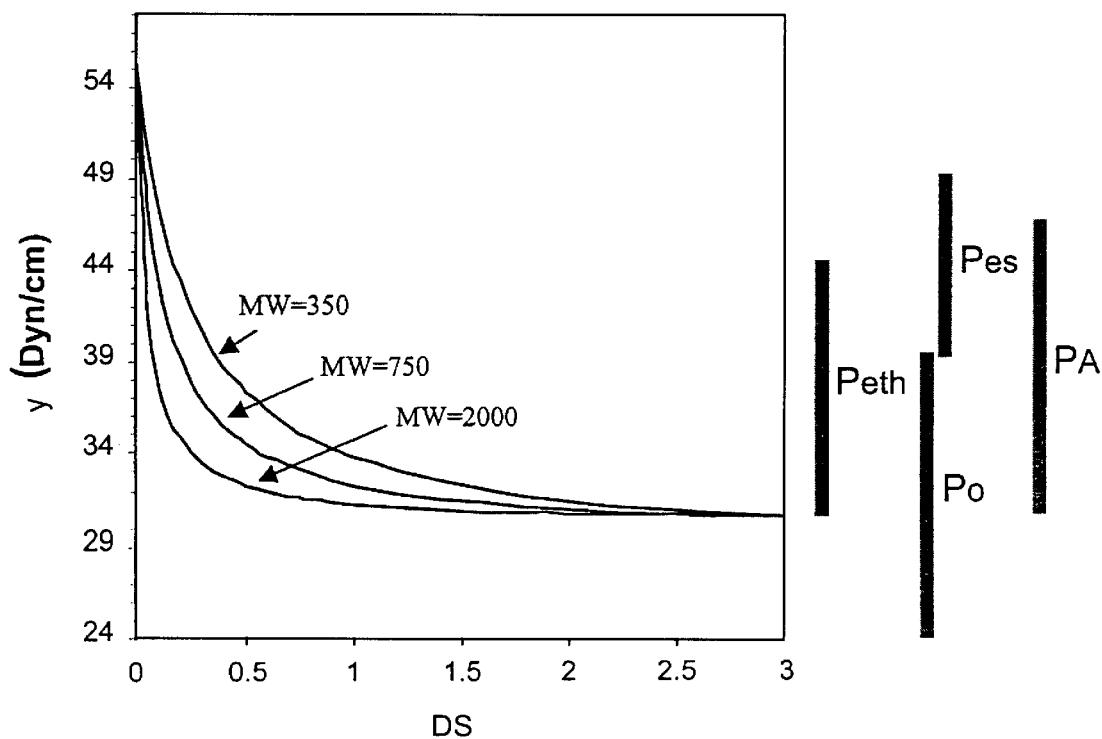

FIGS. 2A and 2B show the changes in the polarity and surface tension of the cellulose with the changes in both the degree of substitution (DS) and molecular weight (MW) of the polyether graft (as an example, the two figures show the changes of $\gamma$ and $\chi$ for chains of polyethylene oxide with molecular weight 350, 750 and 2000). The values shown were calculated using the group contribution method. They are not experimental data.

On the right of the graphs, the values for the various categories of potential matrix polymers are shown.

Polyethylene oxide (PEO) was chosen because it presents a good level of compatibility with numerous polymers.

The polyether chains which are grafted on the activated natural fibers are ready-made chains. The use of ready-made polyether chains makes it possible to use chain grafts whose molecular weight is predetermined according to the extent of the variation that is desired in the surface properties (especially hydrophilicity) of the fiber.

What is claimed:

1. A process for the preparation of polymer-grafted natural fibers comprising the following steps:

converting the hydroxyl groups on the natural fiber into the corresponding salified alcoholate groups;

grafting on the salified alcoholate groups a functionalized polyether containing a leaving group that favors nucleophilic substitution.

2. The process according to claim 1, wherein the step of converting the hydroxyl groups is preceded by a step of pre-treating the natural fibers by drying.

3. The process according to claim 2, wherein the step of pre-treating the fibers is carried out under vacuum at a temperature in the range of from 50° C. to 100° C. for a time of between 2 and 48 hours.

4. The process according to claim 1, wherein the step of converting the hydroxyl groups into salified alcoholate groups is done by adding the pre-treated fiber to an anhydrous reagent solution in an inert atmosphere.

5. The process according to claim 4, wherein the anhydrous reagent solution comprises an alkaline reagent.

6. The process according to claim 5, wherein the reagent is potassium tert-butylate and 18-crown-6 ether in anhydrous tetrahydrofuran.

7. The process according to claim 5, wherein the reagent is sodium methylate in anhydrous methyl alcohol.

8. The process according to claim 1, wherein the functionalized polyether has the general formula (I)

R[—O—X—]$_m$Y    (I)

where:

m is between 1 and 200;

R is an aliphatic or aliphatic/aromatic group;

Y is a functional leaving group;

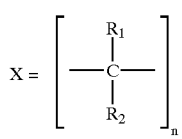

where n is between 1 and 20;

R1 is the same as or different from R2 and is either hydrogen or a linear or branched aliphatic group;

or

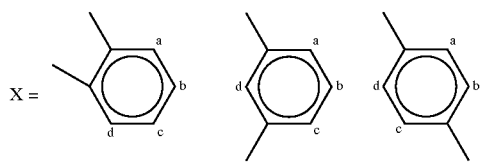

having at the positions of the ring a), b), c) and d) one or more substituting groups which may be the same or different from each other and which may be a group comprising a halogen or a linear or branched C1–C4 alkyl.

9. The process according to claim 8, wherein the functionalized polyether of the general formula (I) is:

R[—O—X—]$_m$Y    (I)

where:

m is between 4 and 60;

R is hydrogen, a linear or branched $C_1$–$C_4$ alkyl group, or a benzyl group;

Y is iodine (—I) or a mesylate group (—O—$SO_2$—$CH_3$);

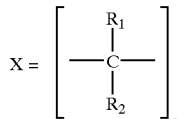

where:

n is between 2 and 5;

$R_1$ is the same as or different from $R_2$ and is either hydrogen or a linear or branched alkyl group;

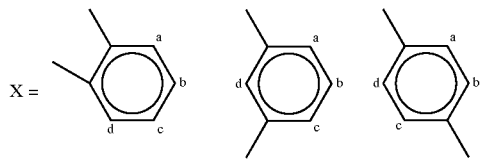

or having at the positions of the ring a), b), c) and d) two substituting groups which may be the same or different from each other and which are selected from the group consisting of chlorine, bromine, iodine and a linear or branched $C_1$–$C_4$ alkyl.

10. The process according to claim 8, wherein the polyether is polyoxyethylene or polyoxypropylene.

11. The process according to claim 7, wherein the step of adding the reagent is followed by one or more steps of filtering and washing with anhydrous tetrahydrofuran.

* * * * *